3 Sheets--Sheet 1.

JAMES M. CLARK.

Improvement in Machines for Washing and other purposes.

No. 4,718. Reissued Jan. 23, 1872.

ATTEST.
Walter Allen
Wm. H. Brereton Jr.

INVENTOR.
James M. Clark
By Knight Bros
Attorneys.

JAMES M. CLARK.

Improvement in Machines for Washing and other purposes.

No. 4,718. Reissued Jan. 23, 1872.

ATTEST.
Walter Allen
Wm. H. Brereton Jr.

INVENTOR
James M. Clark
By Knight Bros
Attorneys.

3 Sheets--Sheet 3.

JAMES M. CLARK.

Improvement in Machines for Washing and other purposes.

No. 4,718.

Reissued Jan. 23, 1872.

ATTEST
Walter Allen
Wm H Burton Jr

INVENTOR.
James M. Clark
By Knight Bros
Attorneys

UNITED STATES PATENT OFFICE.

JAMES M. CLARK, OF LANCASTER, ASSIGNOR TO FRANKLIN L. CLARK, OF CLARKSVILLE, PENNSYLVANIA.

IMPROVEMENT IN MACHINES FOR WASHING AND OTHER PURPOSES.

Specification forming part of Letters Patent No. 117,603, dated August 1, 1871; reissue No. 4,718, dated January 23, 1872.

DIVISION B.

Specification of an Improved Machine for Washing and other Purposes, invented by JAMES M. CLARK, of the city and county of Lancaster, in the State of Pennsylvania.

This invention consists in arranging a series of any desirable number of vertical beaters in a suitable frame; said beaters having either formed on or applied to their faces racks in which gear segmental or mutilated cog-wheels arranged in proper relation to the said racks. Each of the wheels is formed with two or more cogged segments and intervening toothless spaces, so that at each revolution of the shaft each beater will be raised twice or more by the cogs gearing with the racks, and permitted to fall by the toothless spaces. The racks are of sufficient length to permit the segments to impart a full stroke to the beaters, or raise them the same distance, starting from any point. The beaters are guided in their vertical paths by a hinged frame, which, when turned down will permit all or any of the beaters to be removed, reversed, or changed in any manner. The said beaters are provided on their respective ends with feet of different characters, to adapt them for various kinds of work. The feet are also removably attached to the beaters, so that they can be readily changed. Beneath the beaters is a revolving platform formed on its upper surface, with two or more concentric flanges, to receive tubs of various kinds or sizes in which the beaters work. The platform is driven by a vertical shaft, and gearing connecting it with the horizontal driving-shaft. This gearing may be disconnected at will, so as to permit the platform and tub to stand still while the operation of the beaters may be continued. These and other details will be hereinafter particularly described.

Figure 1:
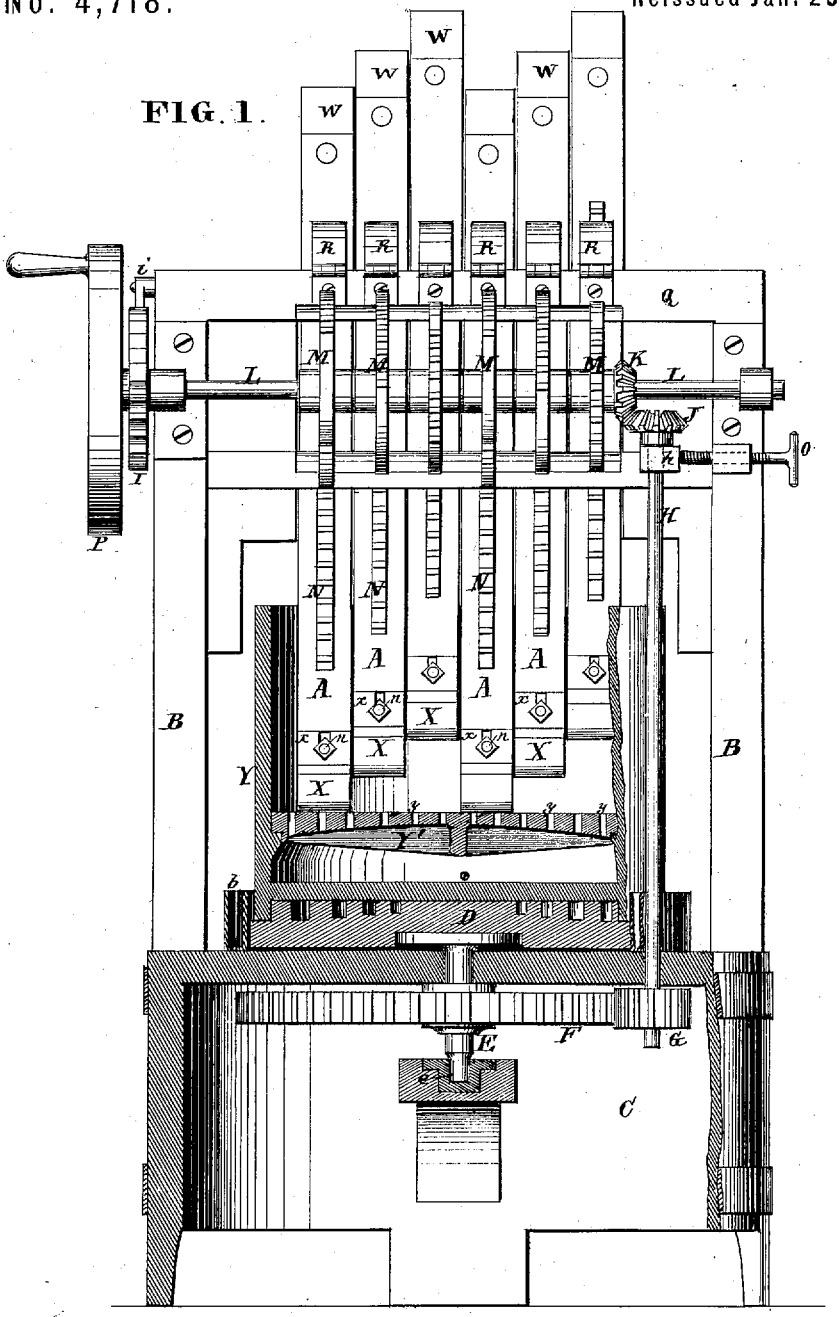
Figure 2:
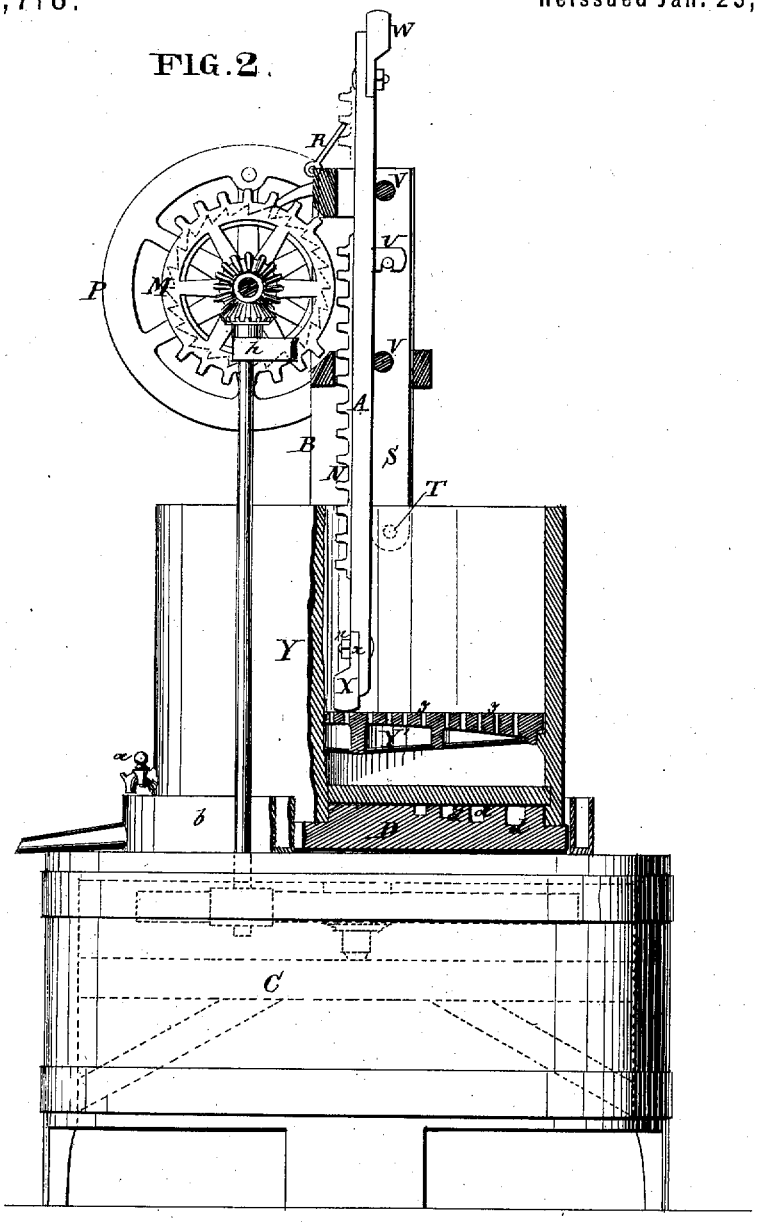
Figure 3:
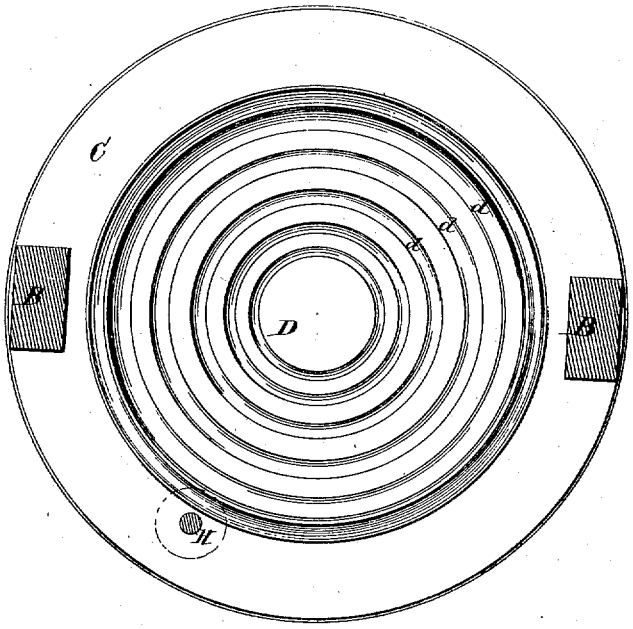
Figure 4:
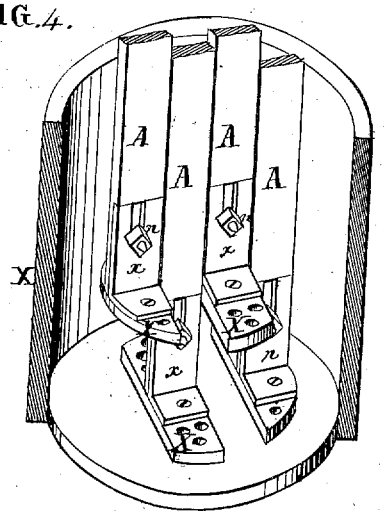

In the drawing, Figure 1 is a front elevation of a machine illustrating my invention, the supporting base, revolving platform, and removable tub being shown in section. Fig. 2 is a side elevation partly in section. Fig. 3 is a plan of the revolving platform and base with the tub and upper parts removed. Fig. 4 is a sectional perspective view of a tub with beaters working therein.

A A A are a series of beaters, guided in a vertical or nearly vertical path by a frame, B Q, the standards B B of which, are mounted in a supporting bed or base, C, of any suitable construction. Above the base C is a revolving platform, D, mounted on the top of a vertical shaft, E, which rests in a step, *e*, and is rotated by gearing F G, the pinion G being keyed upon a vertical shaft, H, which is connected through miter pinions J K, with the main driving-shaft L. The revolving platform D is formed on top with a number of concentric flanges, *d d*, adapting it to receive movable tubs Y, of various kinds and sizes. For most purposes the tubs are provided with removable perforated false bottoms *y*, at a little distance above the true bottoms. For all washing purposes, and others where liquids have to be discharged, the tub is also furnished with a cock, *a*, delivering into an endless trough, *b*, upon the stationary base C. Upon the shaft L are keyed mutilated cog-wheels M, corresponding in number and position with the beaters A, and adapted to mesh with racks N, attached to the said beaters. The shaft L may be rotated through a pulley, P, driven by a belt or by a crank-handle, as may be required by convenience, or by the size of the machinery and extent of the labor to be performed. Upon the shaft L is also keyed a ratchet-wheel, I, engaged by a pawl, *i*, pivoted to the main frame. This pawl and ratchet-wheel may be arranged to "dog" or check the shaft against rotation in either direction as requested. The vertical shaft H has its upper bearing in a pivoted cross-beam, *h*, to admit of the pinion J to be drawn out of gear with the pinion K, if it be desired to stop the rotation of the tub while the action of the beaters may be continued. When the pinion J is to be held in gear, a jam-screw, O, is turned in against the pivoted beam *h*, so as to hold the latter rigidly in position. Dogs, R, hinged separately to the upper cross-beam Q of the frame, are arranged to be turned any one or more of them back against the beaters, and when so placed, they will, by engaging with the racks N, support and retain the particular beaters at the highest point to which such beaters may be elevated by the segment-wheels. The teeth on these wheels M may extend over arcs of ninety degrees more or less, and there may be two or more such cogged segments on each wheel. They are preferably arranged so as to act successively on their beaters, so that the latter will fall alternately, one or more at a time. The racks N are of greater length than the toothed arcs, so that whether the beaters are at their lowest position, or are already elevated by resting upon a body on which they act; when the segment takes on to the rack, the beater will be carried up to a full stroke above the point of starting. The beaters are furnised at their ends with feet or shoes W X, of any form which may be adapted for the particular work to be performed. These feet are formed with open slotted shanks *x*, which are attached by clamp-nuts *n*, permitting the ready removal and replacing of the shoes, so that the machine may be converted from one use to another with great facility. The beaters being provided with feet or shoes of different form at their respective ends, a change is readily made by simply reversing them. They may, for example, be formed at one end for stamping or crushing, and at the other for cutting. The upper shoe also acts as a weight to add to the force of the blow. When this is to be done, the frame S is released from its hooks U, and turned down on its pivot T, allowing the beaters to fall away from the segment-wheels and to be taken out. In Fig. 3 are shown feet projecting horizontally from the beater-shafts. V V are friction-rollers, extending from side to side of the frame S, and serving to brace the beaters against the segment-wheels when at work, and reduce friction as they pass freely up and down.

I claim as my invention—

1. The combination of the reciprocating beaters A, long racks N, and wheels M, each of said wheels being formed with a plurality of cogged segments and intervening toothless spaces, and arranged as herein described, to elevate the beaters twice or more by each revolution of the shafts to an equal distance from any starting point, substantially as and for the purpose set forth.

2. The hinged frame S, constructed and arranged as described, to retain the beaters in their operative positions or permit their ready removal, as explained.

3. The revolving flanged platform D, constructed substantially as described, to adapt it to receive and center tubs of various kinds or sizes, and to operate in connection with the beaters A and gearing M, substantially as explained.

4. The combination of the beaters A segment-wheels M, and revolving platform D, geared together as described, with the clutch mechanism J *h* O, for throwing the platform out of gear when required.

5. The removable shoes and weights with open slotted stocks, constructed as shown, to adapt them to be readily attached to the beater-shafts and removed therefrom.

6. The separate hinged dogs R, adapted as described, to retain any one or more of the beaters in their upper position.

7. The gearing F G, located underneath the bed C, and rotating the platform D, through the medium of the shaft E, as described.

8. The combination of the beaters ~~A, seg~~ ment-wheels M, shafts L H E, gearing K J G F, and revolving platform D, arranged and operating as described.

9. The friction-rollers V, in combination with the frame S, for keeping the beaters in position, as described, and to avoid friction to the beaters in their ascent and descent.

JAMES M. CLARK.

Witnesses:
OCTAVIUS KNIGHT,
WALTER ALLEN.